April 13, 1965 G. R. DOUGLAS 3,177,727
ANGULAR VELOCITY MEASURING DEVICE
Filed May 23, 1962

INVENTOR
George R. Douglas
BY
AGENT

United States Patent Office 3,177,727
Patented Apr. 13, 1965

3,177,727
ANGULAR VELOCITY MEASURING DEVICE
George R. Douglas, Wilkinsburg, Pa., assignor to Westinghouse Electric Corporation, East Pittsburgh, Pa., a corporation of Pennsylvania
Filed May 23, 1962, Ser. No. 197,136
4 Claims. (Cl. 73—505)

This invention relates to devices for measuring rates of turning, angular velocity, and more particularly to solid state vibratory gyro devices for this purpose.

The present invention further relates to what is considered to be an improvement in a previous vibratory gyro device of a type or types employing a magnetostrictive or ferromagnetic material such as are disclosed and described in United States patent application Serial No. 106,116, filed April 27, 1961, and assigned to the assignee of the present application.

In such previously-proposed vibratory gyro devices employing an element of magnetostrictive material such as nickel, this element had a "permanent" polarization with a residual or built-in flux. Difficulty can be experienced in fabricating or trimming such devices to obtain an output signal which is nulled in the absence of input motion. This lack of null, which amounts to presence of a spurious signal, in cases can be large as compared to minimum response rate signal sensitivity desired to be measured.

In view of the foregoing remarks, it becomes an object of the present invention to provide an improved vibratory gyro device of the aforementioned type employing an element of magnetostrictive material, which facilitates the obtaining of the desired output signal null.

The present invention contemplates that the lack of a null signal in the aforementioned cases was due to a lack of symmetry in the polarization pattern in the elements involved, accounting for a detecting of the driven vibration by the output signal electrodes and giving an output signal in absence of any input motion of the device. It was found that the obtaining of a polarization pattern of required symmetry initially, or subsequently as a trimming operation, is difficult to obtain when permanent polarization of the magnetostrictive element is relied on.

It is therefore another object of the present invention to provide a vibratory gyro device of the aforementioned general type, which affords facile obtainment of a polarization pattern of the magnetostrictive element whereby the sensing of the driven vibration by the output electrodes of the device is eliminated and the desired null signal is attained.

In accord with general features of the present invention, the required flux pattern in the magnetostrictive element is obtained by an external permanent magnet means rather than by permanent polarization of such element, with the advantage that such external permanent magnet means may be readily adjusted in position to alter such pattern to obtain output signal nulling of the device. This also offers an advantage of affording an increase in the flux in the magnetostrictive element and consequent increase in the sensitivity of the device, as well as an arrangement which is more reliably immune to accidental depolarization by such as stray strong alternating current fields, inasmuch as materials used for permanent magnets are better in this regard than magnetostrictive materials.

Other objects and advantages of the invention will become apparent from the following detailed description when taken in connection with the accompanying drawing in which.

DESCRIPTION

Figure 1:
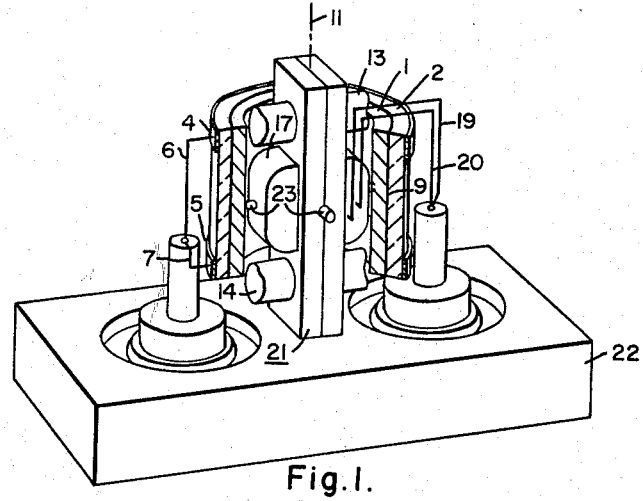
FIGURE 1 is a three-dimensional view in outline of an exemplified solid state vibratory gyro device embodying the invention.
Figure 2:
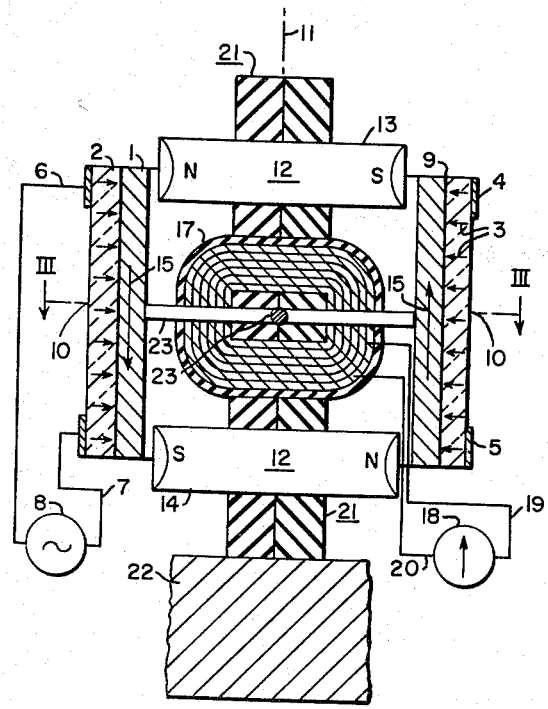
FIG. 2 is a diagrammatic cross-section view in elevation of the device of FIG. 1.

Referring to FIGS. 1 and 2, an exemplified embodiment of the vibratory gyro device of the present invention comprises inner and outer coaxial contiguous hollow cylindrical elements 1 and 2 of magnetostrictive and electrostrictive materials, respectively, nickel and lead zirconium titanate, respectively, for example.

The outer element 2 of electrostrictive material is permanently polarized radially inward throughout its mass in the direction of the arrows 3, FIG. 2. Excitation input electrodes 4 and 5 in form of thin coatings or bands of conductive material such as silver bearing epoxy encircle opposite ends of the outer cylindrical surface of element 2. These input electrodes are connected to excitation input leads 6 and 7 which in turn are connected to opposite terminals of a source 8 of high frequency excitation current suitable to effect vibration of the element 2 and associated element 1 at resonance of the assemblage. In one working model employing a thin conductive epoxy bond 9 between the two elements 1 and 2 of nickel and lead zirconium titanate having walls .040 inch thick, inner and outer diameters of .320 and .480 inch, respectively, as an assemblage and a length of .355 inch, a frequency of 135 kilocycles was found to be suitable.

Energization of the electrostrictive element 2 via electrodes 4 and 5 causes alternate radial and circumferential expansion and contraction of its upper and lower halves 180 degrees out of phase and progressively from its mid portion equidistant its opposite ends where a radial-vibration circumferential nodal line 10 exists. This in turn causes corresponding and similar vibration of the inner element 1. During such radially and circumferentially driven vibration of the assemblage 1, 2 if same is turned about a motion input axis 11, which is the geometric axis of revolution of elements 1 and 2, a torsional vibratory reaction is caused between such upper and lower halves as a result of the differential in amounts of inertia of such halves due to their out of phase radial-circumferential driven vibration. Such torsional vibration also is substantially nihil along the same nodal line 10 for the radial vibration. These radially-driven and torsionally-reactive vibratory actions within the assemblage 1, 2 are in accord with previous disclosure as described in the aforementioned patent application Serial No. 106,116.

Figure 3:
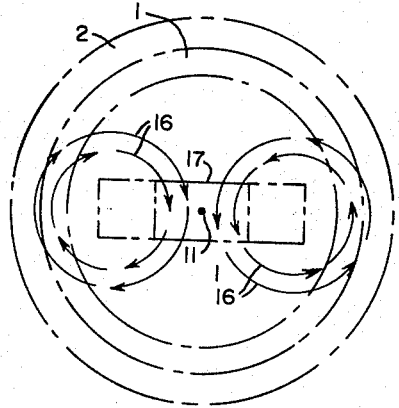
FIG. 3 is a diagrammatic cross-section view of an output coil embodied in the device, taken along the line III—III in FIG. 2 and illustrating the flux pattern to which such coil is subjected for signal output.

In accord with the novel features of the present invention, the magnetostrictive element 1 which is driven by the electrostrictive element 2 is subject to the influence of magnetomotive forces from a permanent magnet means 12 which develops a flux pattern and polarization within element 1 for response to the output or torsional mode of vibration of the assemblage 1, 2. The permanent magnet means 12 comprises a pair of bar magnets 13, 14 of such as ceramic material which are disposed in opposite ends of element 2, respectively, and arranged with reversed polarity to give a polarization of element 1 axially and in opposite directions at opposite radially-extending ends of the magnet means 12, as indicated by the arrows 15 in FIG. 2. Responsively to the torsional reaction of the assemblage 1, 2 upon an input turning movement of same about its axis 11 as aforedescribed, a vibratory torsional shear vector is developed in the magnetostrictive element 1 in a radial direction, and this produces circumferential alternating signal flux in opposite rotary directions at opposite sides of the axis 11, respectively, and passing through the center of such element 1, as indicated by the arrows 16 in FIG. 3. This signal flux in turn is sensed by a pickoff coil 17 arranged with its axis equidistant opposite ends of assemblage 1, 2 and perpendicular to the axis 11 thereof, as well as perpendicular to the direction of extension of permanent magnet elements 13 and 14. The electrical signal produced by such pickoff coil is fed to a signal indicating means 18 via leads 19 and 20. The magnitude of this signal indicates the rate of turning of the assemblage 1, 2 about the axis 11, and the phase of such signal relative to an alternating current reference indicates the direction of such input turning motion.

The assemblage 1, 2, the pickoff coil 17, and the permanent magnets 13 and 14 are mounted on an elongated support means 21 which is attached to a base 22 for mounting on a vehicle or body in proper orientation for sensing rate of motion about a selected axis. Support means 21 is of insulating material and supports coil 17 as well as pins 23 which extend outwardly of means 21 for supporting cooperation with the interior of element 1 substantially equidistant its opposite ends at the nodal region of the radial and torsional modes of vibration of the assemblage 1, 2.

Once having fit the assemblage 1, 2 onto the pins 23 and in encirclement of the coil 17, and during excitation of electrodes 4 and 5, variations in the degree of cross-sectional roundness of the cylindrical elements 1 and 2 may cause a spurious signal to appear at the output of the pickoff coil 17 due to circumferential dissymmetry of the polarization pattern of the assemblage and a sensing of the radially driven mode by the coil 17 in absence of any input turning movement. This spurious signal, or contribution to spurious signal, in accord with a feature of the present invention, can be trimmed out by turning adjustment in the circumferential position of the cylinder assemblage 1, 2 on the pins 23 relative to the coil 17. During such turning-movement-adjustment, an external alternating current demagnetizing field is employed to to wipe out any previous residual flux in the magnetostrictive element caused by the magnets 13 and 14 in their previous positions. The demagnetizing field chosen is one which is effective for the purpose, but does not affect the residual flux of the magnets. Once having trimmed out the circumferential dissymmetry component of any spurious signal which may exist, the cylindrical element assemblage 1, 2 may be fixed to the pins 23 as by an epoxy cement. Other sources of spurious signal such as may be caused by longitudinal dissymmetry of the elements 1 and 2, may be trimmed out by such as addition of a metal wire or tab to one end which may be bent toward or away from such end to adjust the relative longitudinal mass balance of the assemblage.

As to the sensitivity of the device, tests with an embodiment of the exemplified form indicate that angular rates of a fraction of a degree per second readily may be detected.

While there have been shown and described what is at present considered to be a preferred embodiment of the invention, modifications thereto will readily occur to those skilled in the art. It is not desired therefore, that the invention necessarily be limited to the specific arrangements shown and described, and it is intended to cover in the appended claims all such modifications as fall within the true spirit and scope of the invention.

I therefore particularly point out and distinctly claim as my invention:

1. In a vibratory gyro device, the combination of a hollow cylindrical magnetostrictive element vibrated torsionally in out-of-phase relationship in opposite directions from a nodal plane equidistant its opposite ends during input turning motion of said device about the geometric axis of revolution of said element, and a pair of elongated permanent magnets polarized longitudinally and extending transversely within said element adjacent to its opposite ends, respectively, said magnets being arranged to be of opposite polarity one with respect to the other, and an output pickoff coil disposed centrally within said element and having an axis perpendicular to the aforesaid axis of said element and perpendicular to the direction of extension of said magnets.

2. In a vibratory gyro device, the combination of a hollow cylindrical magnetostrictive element vibrated torsionally in out-of-phase relationship in opposite directions from a nodal plane equidistant its opposite ends during input turning motion of said device about the geometric axis of revolution of said element, and a pair of elongated permanent magnets polarized longitudinally and extending transversely within said element adjacent to its opposite ends, respectively, said magnets being arranged to be of opposite polarity one with respect to the other, an output pickoff coil disposed centrally within said element and having an axis perpendicular to the aforesaid axis of said element and perpendicular to the direction of extension of said magnets, a mounting base, and means secured to said base and projecting into said element in support of said magnets and of said coil, and means carried by the last-named means for supporting said element in the region of the aforesaid nodal plane.

3. In a vibratory gyro device, the combination of a hollow cylindrical magnetostrictive element vibrated torsionally in out-of-phase relationship in opposite directions from a nodal plane equidistant its opposite ends during input turning motion of said device about the geometric axis of revolution of said element, and a pair of elongated permanent magnets polarized longitudinally and extending transversely within said element adjacent to its opposite ends, respectively, said magnets being arranged to be of opposite polarity one with respect to the other, an output pickoff coil disposed centrally within said element and having an axis perpendicular to the aforesaid axis of said element and perpendicular to the direction of extension of said magnets, and an outer cylindrical element of electrostrictive material bonded to the exterior of said magnetostrictive element, said outer element being polarized radially inward throughout its length and provided with input excitation electrodes on its exterior surface at its opposite ends to enable the driving of the assemblage of the recited cylindrical element in a radial vibratory mode, progressively from said nodal plane toward each end of such assemblage and 180° out-of-phase at opposite sides of said plane.

4. In a vibratory gyro device, the combination of a hollow cylindrical magnetostrictive element vibrated torsionally in out-of-phase relationship in opposite directions from a nodal plane equidistant its opposite ends during input turning motion of said device about the geometric axis of revolution of said element, and a pair of elongated permanent magnets polarized longitudinally and extending transversely within said element adjacent to its opposite ends, respectively, said magnets being arranged to be of opposite polarity one with respect to the other, an output pickoff coil disposed centrally within said element and having an axis perpendicular to the aforesaid axis of said element and perpendicular to the direction of extension of said magnets, an outer cylindrical element of electrostrictive material bonded to the exterior of said magnetostrictive element, said outer element being polarized radially inward throughout its length and provided with input excitation electrodes on its exterior surface at its opposite ends to enable the driving of the assemblage of the recited cylindrical element in a radial vibratory mode, progressively from said nodal plane toward each end of such assemblage and 180° out-of-phase at opposite sides of said plane, a mounting base and means secured to said base supporting said assemblage of elements along said nodal plane, and supporting said magnets and pickoff coil in spaced apart relationship to said assemblage.

References Cited by the Examiner

UNITED STATES PATENTS

| | | | |
|---|---|---|---|
| 2,627,400 | 2/53 | Lyman | 73—505 |
| 2,683,247 | 7/54 | Wiley | 73—505 |
| 2,712,124 | 6/55 | Ording | 310—26 |
| 2,974,530 | 3/61 | Jaouen | 73—505 |
| 2,978,670 | 4/61 | Peek | 310—26 |
| 3,021,711 | 2/62 | Arvidson | 73—398 |

RICHARD C. QUESSER, *Primary Examiner.*

ROBERT L. EVANS, JAMES J. GILL, *Examiners.*